United States Patent
Patel et al.

(10) Patent No.: US 8,136,845 B2
(45) Date of Patent: Mar. 20, 2012

(54) CLAMP TENSION COMPENSATING, SELF-SUSTAINING CUFF APPARATUS AND METHOD

(75) Inventors: Jayant D. Patel, Lake Forest, CA (US); Clifford J. Petersen, Irvine, CA (US); Maggie E. Fuselier, Seal Beach, CA (US); Alfred R. Wiratunga, Northridge, CA (US); Annette D. Motherwell, Cypress, CA (US); Vitor M. Amorim, Whittier, CA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 11/962,493

(22) Filed: Dec. 21, 2007

(65) Prior Publication Data

US 2009/0162140 A1 Jun. 25, 2009

(51) Int. Cl.
*F16L 21/00* (2006.01)
(52) U.S. Cl. .................................. 285/236; 285/417
(58) Field of Classification Search .................. 285/235, 285/236, 294.2, 417, 369, 226
See application file for complete search history.

(56) References Cited

U.S. PATENT DOCUMENTS

| | | | | | |
|---|---|---|---|---|---|
| 413,170 | A | * | 10/1889 | Camp | 285/294.2 |
| 1,628,302 | A | * | 5/1927 | Bray | 285/236 |
| 1,696,435 | A | * | 12/1928 | Fraley | 285/229 |
| 2,794,483 | A | * | 6/1957 | Hopkins et al. | 285/294.2 |
| 2,917,102 | A | * | 12/1959 | Mahady | 156/144 |
| 3,235,289 | A | * | 2/1966 | Jones | 285/21.2 |
| 3,424,482 | A | * | 1/1969 | Ligon | 285/230 |
| 3,558,164 | A | * | 1/1971 | Havell | 285/236 |
| 3,580,616 | A | * | 5/1971 | Merkwacz | 285/229 |
| 3,623,339 | A | * | 11/1971 | Muller | 285/226 |
| 3,747,367 | A | * | 7/1973 | Muller | 285/226 |
| 3,813,116 | A | * | 5/1974 | Horsley | 285/236 |
| 3,979,142 | A | * | 9/1976 | Fujisawa | 285/235 |
| 4,098,528 | A | * | 7/1978 | Stanley | 285/235 |
| 4,229,028 | A | * | 10/1980 | Gray | 285/235 |
| 4,240,653 | A | * | 12/1980 | Ishigaki et al. | 285/235 |
| 4,250,223 | A | * | 2/1981 | Cook | 285/226 |
| 4,942,906 | A | * | 7/1990 | Igarashi et al. | 138/126 |
| 5,096,206 | A | * | 3/1992 | Andre et al. | 277/314 |
| 5,193,859 | A | * | 3/1993 | McKinnon | 285/417 |
| 5,527,070 | A | * | 6/1996 | Blackwell | 285/45 |
| 5,908,211 | A | * | 6/1999 | Blackwell et al. | 285/294.2 |
| 6,039,359 | A | * | 3/2000 | Valenziano | 285/45 |
| 6,145,895 | A | * | 11/2000 | Patel et al. | 285/369 |
| 6,811,192 | B2 | * | 11/2004 | Patel et al. | 285/417 |
| 6,830,076 | B1 | | 12/2004 | Patel | |
| 6,949,163 | B2 | * | 9/2005 | Patel et al. | 156/307.1 |
| 6,994,378 | B2 | * | 2/2006 | Patel et al. | 285/235 |
| 7,028,383 | B2 | * | 4/2006 | Patel et al. | 29/506 |
| 7,452,005 | B2 | * | 11/2008 | Kramer | 285/236 |

* cited by examiner

*Primary Examiner* — David E Bochna
(74) *Attorney, Agent, or Firm* — Harness, Dickey & Pierce, P.L.C.

(57) ABSTRACT

A coupling apparatus for coupling free ends of a pair of tubular ducts in flow communication with one another, and where the free ends of the ducts are separated by an axial gap. The apparatus may have a sleeve having a length sufficient to span the gap and to overlap portions of the free ends of the ducts when the sleeve is secured to the free ends of the ducts. The sleeve may include a first stretchable ply of material, a non-stretchable ply of material, and a second stretchable ply of material sandwiched together. The non-stretchable ply of material may be disposed between the first and second stretchable plies of material to form a unitary assembly. The non-stretchable ply of material may have an axial length of no more than approximately a length of the axial gap to overlay the axial gap.

17 Claims, 8 Drawing Sheets

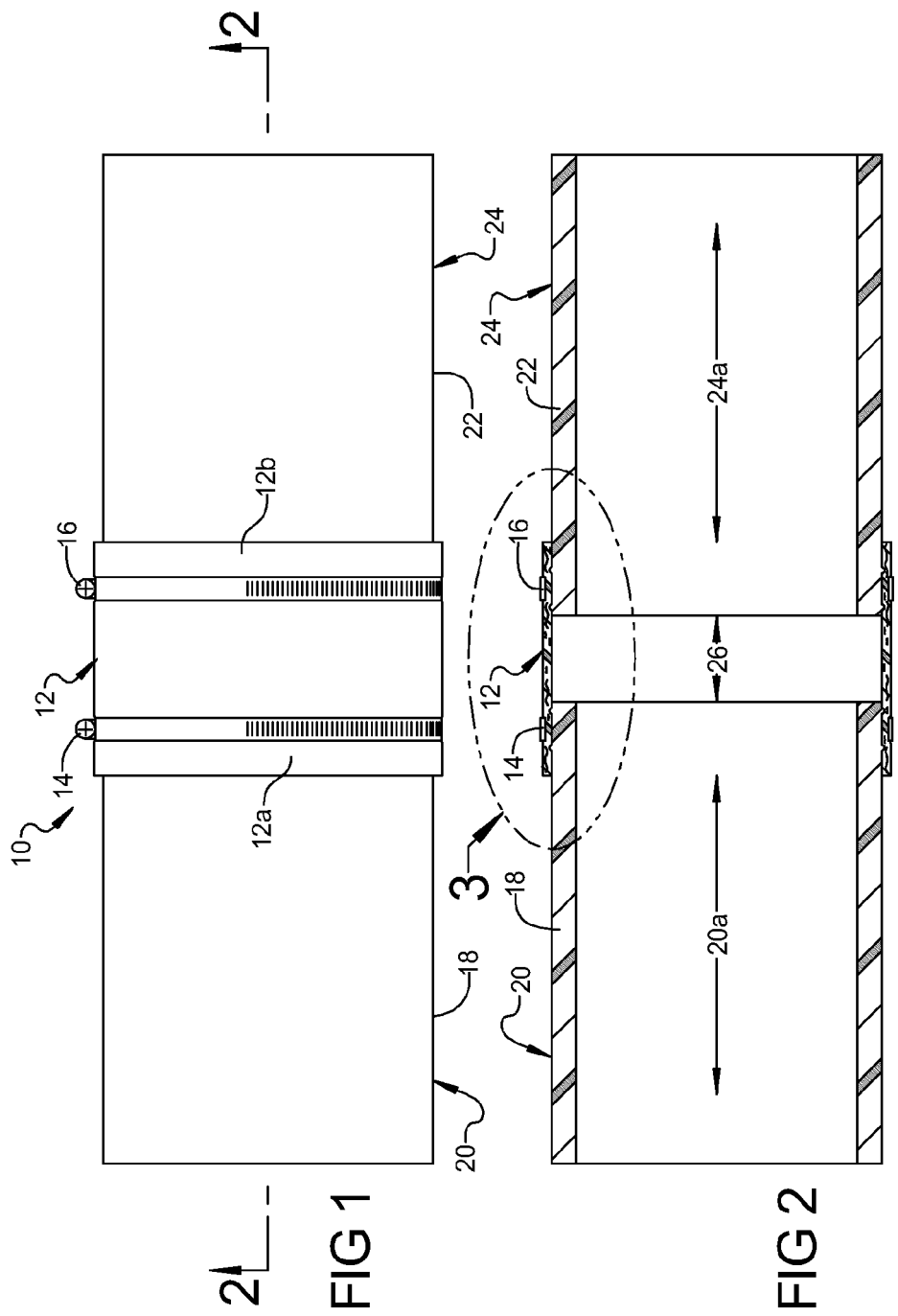

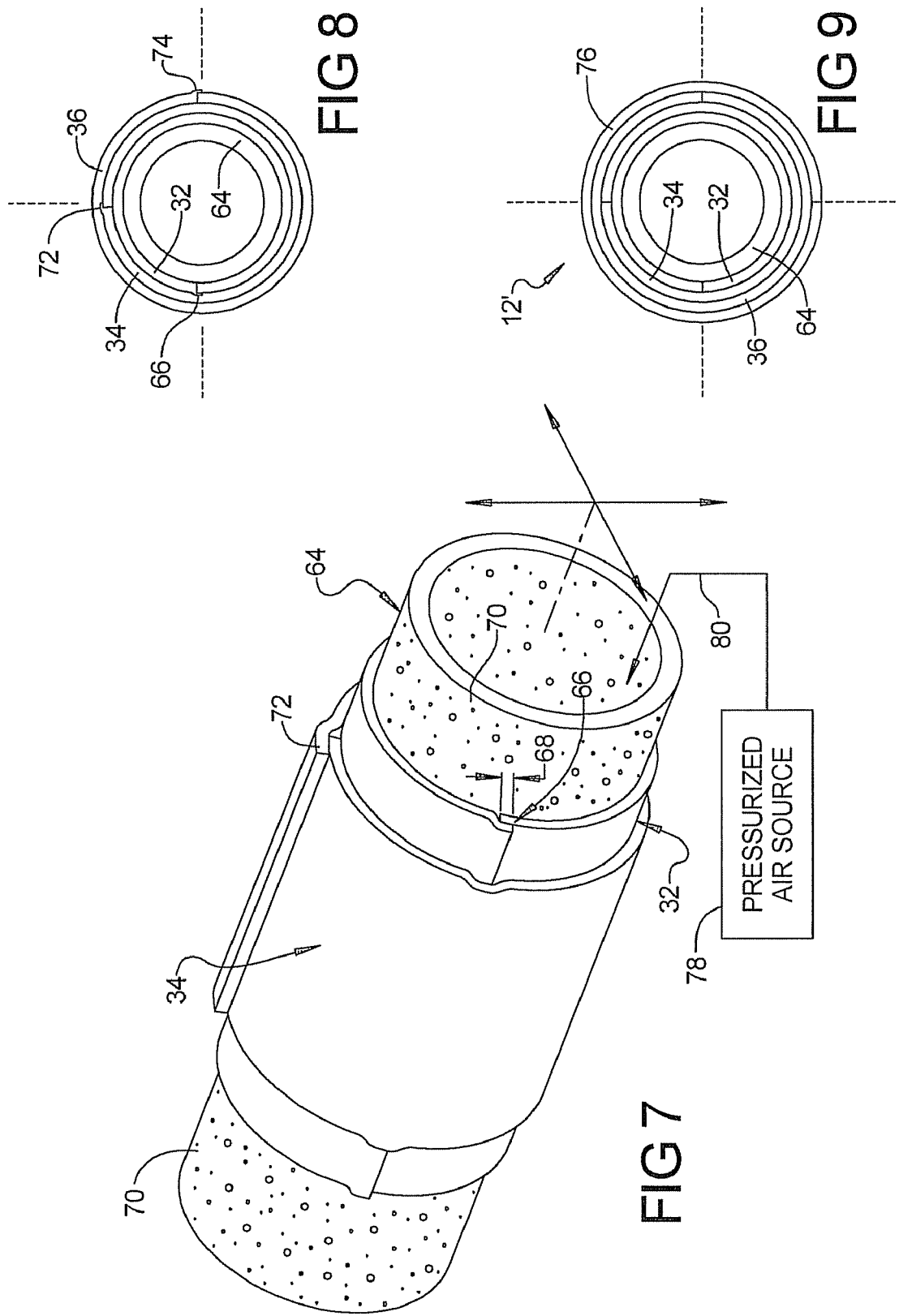

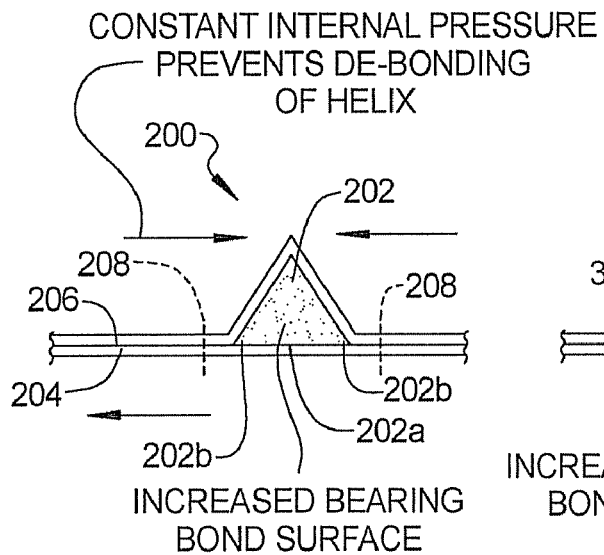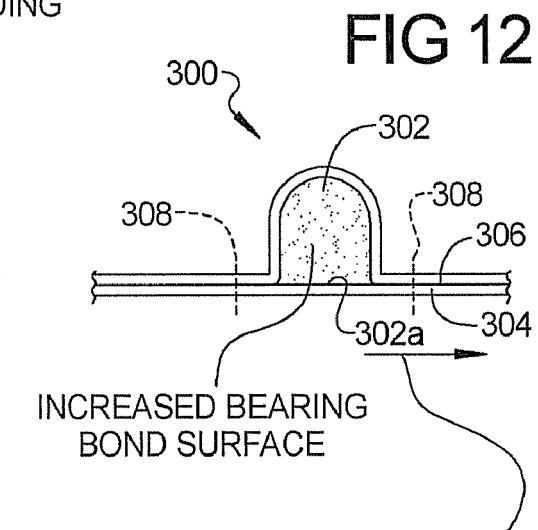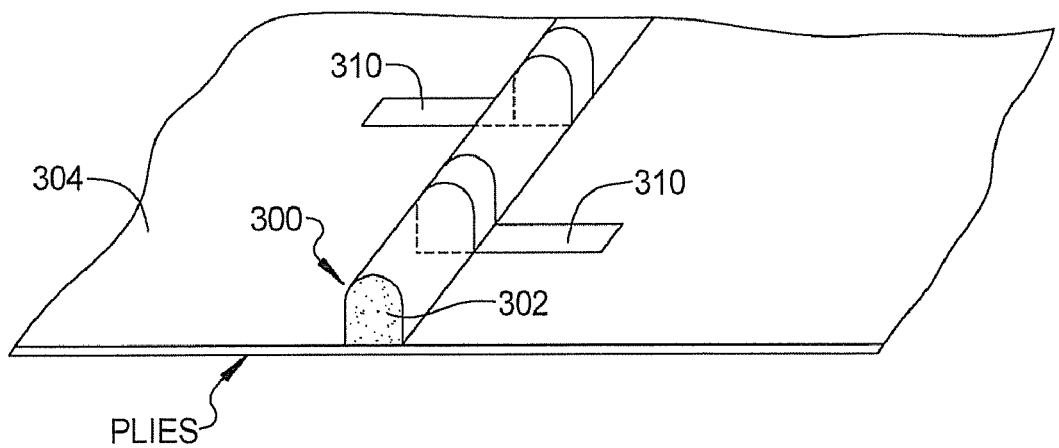

FIG 14
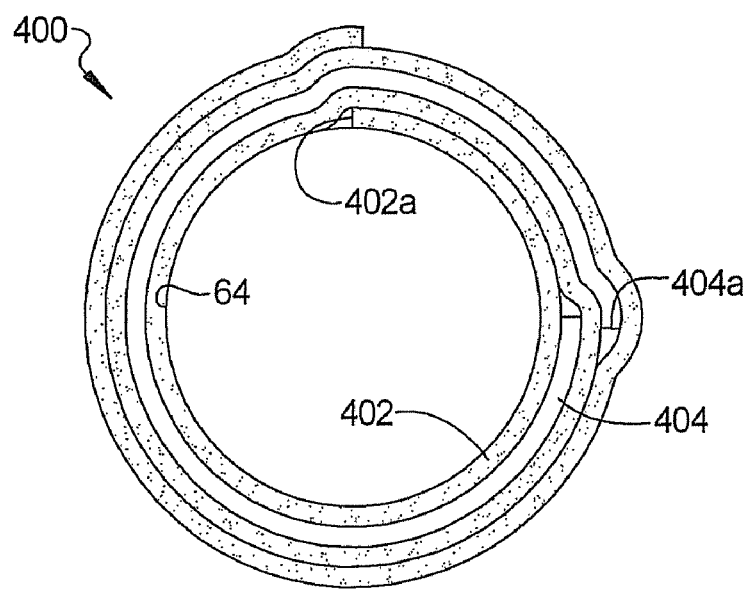
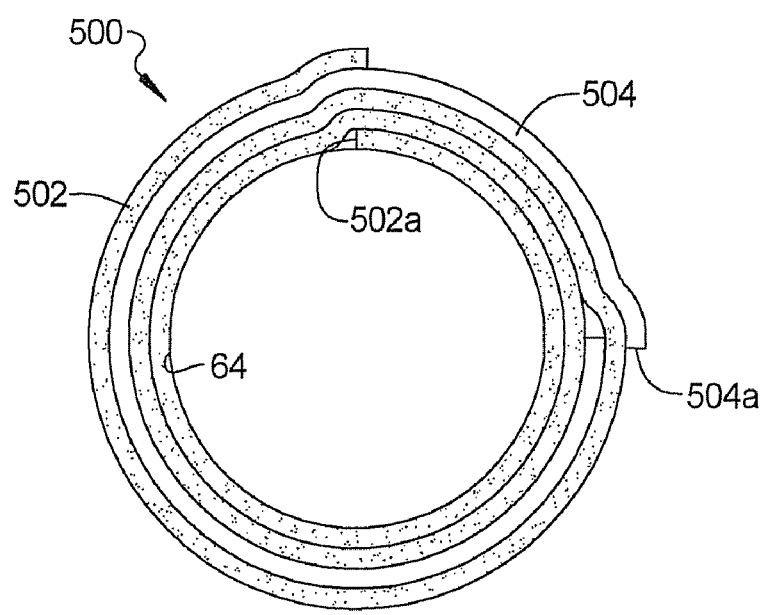
FIG 15

CLAMP TENSION COMPENSATING, SELF-SUSTAINING CUFF APPARATUS AND METHOD

FIELD

The present disclosure relates to systems and methods for bridging or joining the free ends of a two tubular ducts, and more particularly to an apparatus and method for coupling the free ends of a pair of ducts used for flowing a high pressure and/or high temperature fluid, and which also is capable of accommodating a degree of misalignment of the free ends of the ducts being coupled without straining the apparatus, and while providing a leak proof connection.

BACKGROUND

The statements in this section merely provide background information related to the present disclosure and may not constitute prior art.

Coupling devices are often used to couple the free ends of adjacent tubular ducts. Such devices are used extensively in aircraft applications, which typically have a large amount of ducting for routing various high pressure and/or high temperature fluids and/or airflows (e.g, engine bleed air, trim air, etc.). In commercial and military aircraft, such coupling devices can number 500 or more.

Present day coupling devices may suffer from various drawbacks, including "ballooning" at the gap area, which is typically between about 0.5 inch to about 4 inches in length, and which separates the free ends of two ducts. Ballooning may occur from a gradual weakening of the material from which the coupling device is constructed, in response to exposure to the high pressure fluid flowing within the duct, and to many hundreds or thousands of thermal cycles that the coupling device is exposed to. In particular, ballooning may occur from the repeated stretching and elongation of the elastomeric binder material of the device, which can also cause ruptures and leakage.

"Slippage" occurs when coupling device is not secured tightly enough to the ducts via the clamps. Occasionally the material of the coupling device that interfaces with and covers the free ends of the two ducts may itself be so incompressible that even when the clamps are tightened securely on the coupling device, the coupling device may still not be clamped tightly enough to the free ends of the duct. Over tightening of the clamps can also cause problems, and more particularly may cause the clamps to dig in to the material of the coupling device, thus weakening the material. Over tightening can also weaken the structure of the ducts themselves and/or damage the ducts.

Rupturing or tearing of the material of the coupling device may also occur over time. Tearing or rupturing may be caused by inherent weakness in the material used to form the coupling device, or possibly from fatigue caused by vibration, abrasion or periodic movement of the free ends of the ducts.

To address these issues, a metallic clamshell-like structure has often been employed to encapsulate the coupling device. The clamshell-like structure is arranged over the gap area between the free ends of the ducts and secured via clamps, for example hose clamps, or by other mechanical fastening systems including threadable bolts. As will be appreciated, this adds significant expense and complexity, not to mention a significant amount of added weight. In aircraft applications, added weight is particularly undesirable as additional weight reduces the payload of the aircraft or its operating range on a given amount of fuel.

SUMMARY

The present disclosure relates to a coupling apparatus for coupling free ends of a pair of tubular ducts in flow communication with one another, and where the free ends of the ducts are separated by an axial gap. The apparatus may comprise a sleeve having a length sufficient to span the gap and to overlap portions of the free ends of the ducts when the sleeve is secured to the free ends of the ducts. The sleeve may include a first stretchable ply of material, a non-stretchable ply of material, and a second stretchable ply of material sandwiched together. The non-stretchable ply of material may be disposed between the first and second stretchable plies of material to form a unitary assembly. The non-stretchable ply of material may have an axial length of no more than approximately a length of the axial gap to overlay the axial gap.

In another aspect the present disclosure relates to a coupling apparatus for coupling a free end of each one of a pair of tubular ducts in flow communication with one another. The apparatus may comprise a tubular sleeve that includes a first stretchable ply of material having a first surface and a second surface. The first surface may be adapted to be placed against an exterior surface of each free end of pair of the ducts. The first stretchable ply may include a first seam disposed at a first peripheral location. A non-stretchable ply may be included in the tubular sleeve that has first and second surfaces, with the first surface disposed against the second surface of the first stretchable ply. The non-stretchable ply may further have a second seam arranged such that it is circumferentially offset from the first seam. The non-stretchable ply may have an axial length less than that of the first stretchable ply and be positioned such that opposite ends of the first stretchable ply extend past the opposing edges of the non-stretchable ply. A second stretchable ply may be included with the tubular sleeve and may have a first surface, a second surface and a third seam. The first surface may be positioned against the second surface of the non-stretchable ply, and the third seam may be circumferentially offset from the second seam.

In another aspect the present disclosure relates to a coupling apparatus for coupling free ends of a pair of tubular ducts in flow communication with one another, where the free ends of the ducts are separated by an axial gap. The apparatus may comprise a sleeve having a length sufficient to span the gap and to overlap portions of the free ends of the ducts when the sleeve is secured to the free ends of the ducts. The sleeve may include a first stretchable ply of material, a generally non-expandable helical coil, and a second stretchable ply of material sandwiched together, with the helical coil disposed between the first and second stretchable plies of material. The sleeve may form a unitary assembly with the helical coil having an axial length limited to a length that is approximately equal to a length of the axial gap to overlay the axial gap. The helical coil may have a cross-sectional shape that provides at least one flat surface, with the flat surface being positioned against one of the first and second stretchable plies of material to enhance a bond between the helical coil and the one stretchable ply.

BRIEF DESCRIPTION OF THE DRAWINGS

The drawings described herein are for illustration purposes only and are not intended to limit the scope of the present disclosure in any way.

FIG. 1 is a side view of a coupling apparatus in accordance with one embodiment of the present disclosure, secured to the free ends of a pair of ducts;

FIG. 2 is a cross sectional side view of the coupling apparatus taken in accordance with section line 2-2 in FIG. 1;

FIG. 7 shows a perspective end view of a tool and how two of the plies are layed up on the tool and spaced apart around the tool by about 90 degrees;

FIG. 8 shows the tool of FIG. 7 from an end view with all three plies wrapped on the tool, and showing the orientations of the three seams formed by the three plies;

FIG. 9 shows an alternative layup making use of four plies arranged on the tool and how the seams are arranged uniformly 90 degrees from one another around the circumference of the tool;

FIG. 11 is a cross sectional end view of another embodiment of the sleeve that makes use of a helical coil sandwiched between two material plies, and where the helical coil has a triangular cross-sectional shape;

FIG. 12 is a perspective view of another embodiment of the sleeve that includes a D-shaped helical coil; and FIG. 13 shows a plurality of reinforcement tape strips that can be used with either of the helical coils of FIGS. 11 and 12 to even further ensure that the helical coil cannot delaminate from the material plies;

FIG. 14 shows still another embodiment of the sleeve that includes a continuous length of stretchable ply of material that is equal to the sum of independent stretchable plies desired, and that is wrapped continuously on the tool;

FIG. 15 shows another embodiment of the sleeve similar to that shown in FIG. 14, but with the non-stretchable ply arranged to allow one full revolution of the stretchable ply to be wrapped on the outer surface of the tool before the non-stretchable ply is layed up over the stretchable ply.

DETAILED DESCRIPTION

Figure 3:
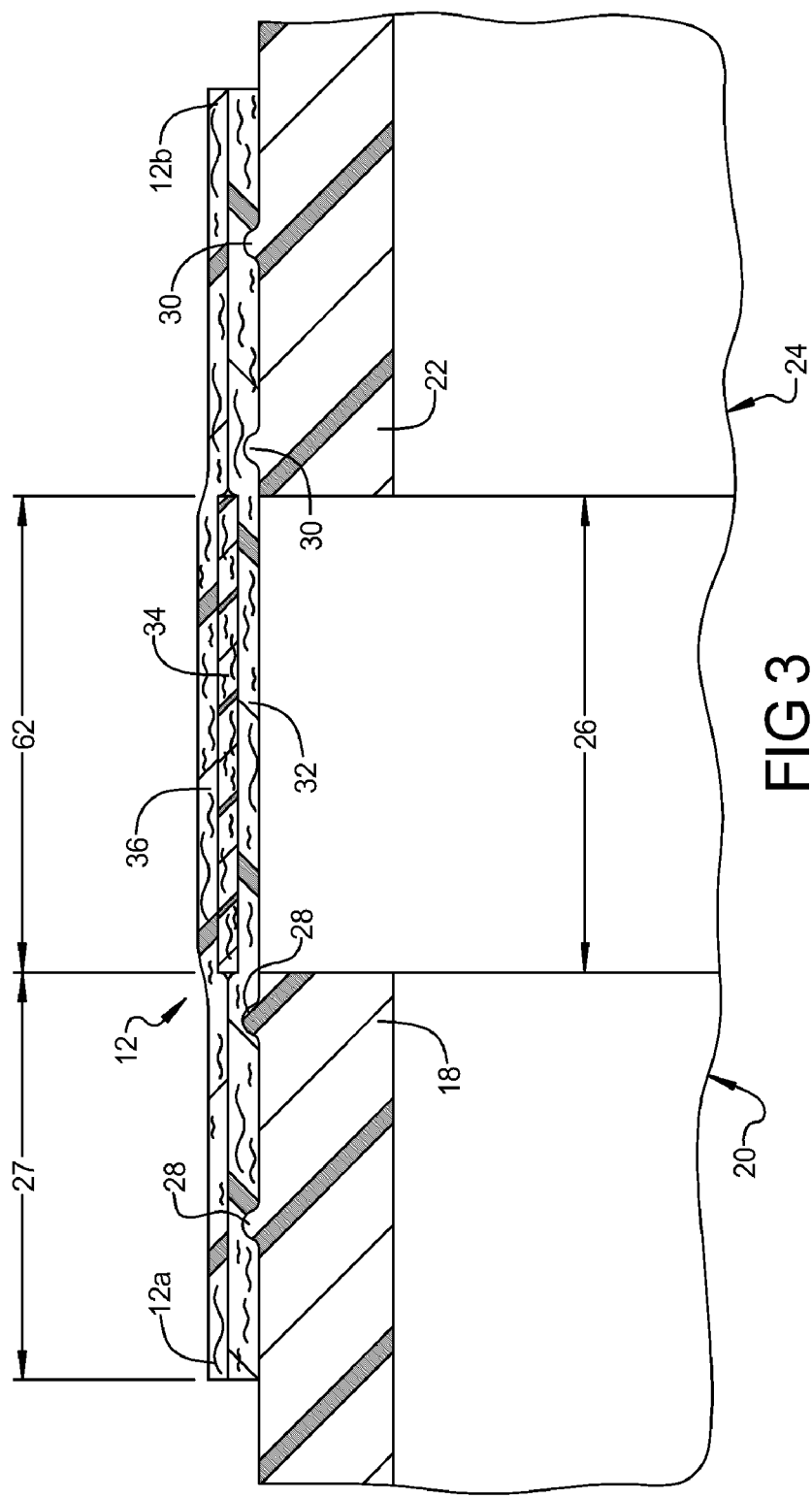
FIG. 3 is an enlarged view of area 3 in FIG. 2 more clearly illustrating the various layers of the sleeve of the apparatus.

Referring to FIG. 1, a coupling apparatus 10 is shown in accordance with one embodiment of the present disclosure. The coupling apparatus 10 includes a cuff or sleeve 12, which for convenience will simply be referred to throughout as a "sleeve". The sleeve 12 has opposing end portions 12a and 12b, and a pair of clamps 14 and 16. The clamp 14 is secured over the first opposing end portion 12a of the sleeve 12 to secure it to a free end 18 of a first duct 20. The second opposing end portion 12b of the sleeve 12 is secured by clamp 16 to a free end 22 of a second duct 24. The clamps 14 are 16 may be of the conventional steel hose clamp variety that have a worm screw that enables the clamp to be tightened with a conventional screwdriver or other hand held tool. However, any suitable clamp may be employed.

The free ends 18 and 22 of the ducts 20 and 24 may be axially aligned, or may be slightly axially misaligned. Merely for convenience, the free ends 18 and 22 are shown in axial alignment with one another. It is an advantage of the sleeve 12 that it can be used to couple the free ends 18 and 22 if the free ends are slightly misaligned, as is not unusual in many applications where ducting is employed. Some slight misalignment is often encountered in assembling ducting used in commercial and military mobile platforms, for example commercial and military aircraft. However, it will be appreciated that the apparatus 10 can be used with ducting employed in any form of mobile platform, such as rotorcraft, airborne unmanned vehicles, land vehicles and with marine vessels. The apparatus 10 is also expected to find utility in terrestrial applications such as in manufacturing plants or any other application where ducting exists that needs to be spliced, and where a secure joint, highly resistant to ballooning, slippage and rupturing is needed.

Referring to FIG. 2, the ducts 20 and 24 can be seen to be separated by a gap, denoted by arrow 26. The gap 26 may vary widely in length, depending on what type of application the ducting is used with. In commercial and military aircraft construction, planning a gap of between about 0.5 inch-4.0 inches (12.7 mm-101.6 mm) in the design phase of the aircraft allows slight axial misalignments to be accounted for with the apparatus 10. By "axial misalignments" it will be understood that this term means the misalignment along a coaxial center of each duct 20 and 24, denoted by arrows 20a and 24a in FIG. 2.

In FIG. 3 the ducts 20 and 24 can also be seen to include beads 28 and 30. The use of beads such as beads 28 and 30 on the exterior of a duct is well known in the industry. The beads 28 and 30 provide extra strength to the free ends of the ducts 20 and 24 and assist in holding a coupling device over the free ends of a duct and preventing slippage of the coupling device relative to the ducts. The beads may be "D" shaped, oval shaped, circular or any other shape that is able to assist in interfacing with the sleeve 12. The beads 28 and 30 may be formed by wire, fiberglass rope, rubber etc., and may be secured to the exterior surfaces of the ducts 20 and 24 by bonding with adhesives. Alternatively, depending on the material that the ducts 20 and 24 are made from, the beads 18 and 22 may be integrally formed with the ducts. The beads 28 and 30 typically project radially outwardly from the exterior surface of the ducts 20 and 24 by about 0.125 inch-0.250 inch (3.175 mm-6.35 mm), but this may vary significantly depending on the material of the ducts 20 and 24 and other factors. The clamp 14 is placed between beads 28 and the clamp 14 is placed between beads 30 during assembly of the apparatus 10 to the ducts 20 and 24.

Referring further to FIG. 3, the highly enlarged, cross-sectional, not to scale view of the apparatus 10 shows the plys used to form the sleeve 12. The sleeve 12 includes a first ply 32 of stretchable material, a ply 34 of non-stretchable material, and a second ply 36 of stretchable material laminated together so that the sleeve 12 forms an integrally formed assembly. The first ply 32 may comprise a resin-impregnated (i.e., B-staged) fibrous or woven material, for example resin-impregnated fiberglass, polyester, DACRON® or KEVLAR® having a thickness in the range of about 0.005 inch-0.01 inch (0.127 mm-0.254 mm). The non-stretchable ply 34 may be formed by a fabric ply, for example a ply made from polyester, nylon, DACRON®, KEVLAR®, or any other non-stretchable, woven or fibrous ply of material. The second stretchable ply 36 may be constructed from the same material as the first ply 32 or from a different material, provided that it is stretchable. One or more additional stretchable plys may be incorporated over the second stretchable ply 36, depending on the desired strength of the sleeve 12.

Figure 4:
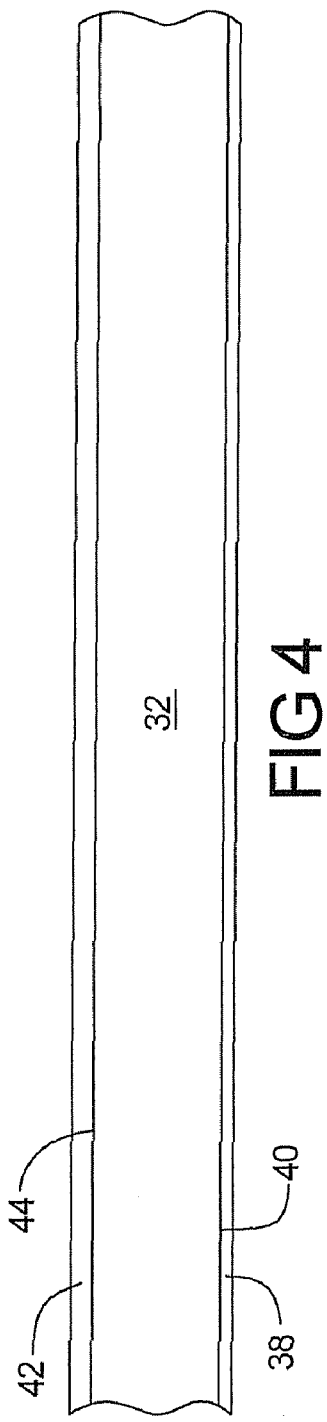
FIG. 4 is a side view showing a portion of the first stretchable ply of resin impregnated material used to construct the sleeve of FIG. 2.
Figure 5:
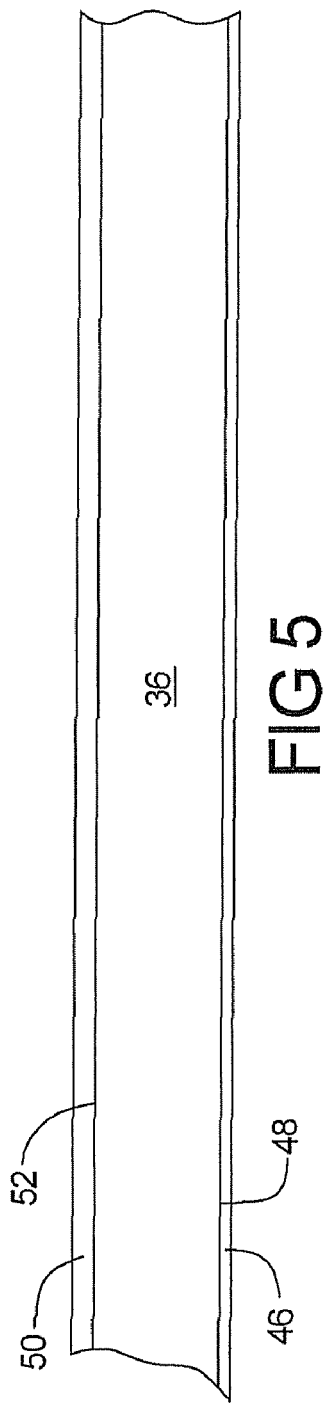
FIG. 5 shows a side view of a portion of the second ply of stretchable, resin impregnated material.
Figure 6:
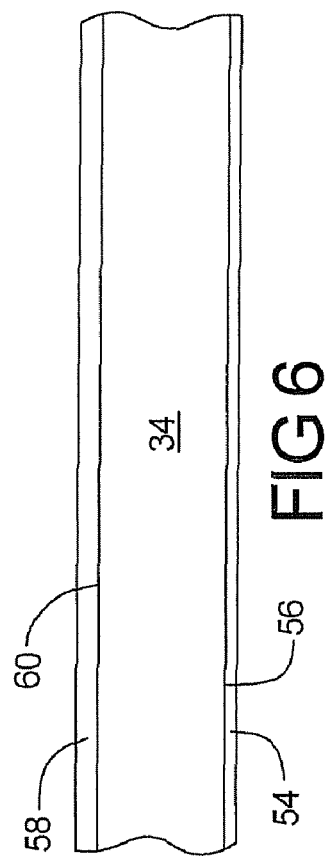
FIG. 6 is a side view of a portion of the non-stretchable ply of material used to construct the sleeve.

Referring to FIGS. 4, 5 and 6, the construction of the plies 32, 36 and 34, prior to being assembled to form the sleeve 12, is shown in greater detail. In FIG. 4 the first stretchable ply 32 preferably includes a resin film layer 38 on its inner surface 40 and a resin film layer 42 on its outer surface 44. The second stretchable ply 36 (FIG. 5) similarly includes a thin resin film layer 46 on its inner surface 48 and a thin resin film layer 50 on its outer surface 52. Resin film layers 38 and 46 preferably each have a thickness of about 0.002 inch-0.003 inch (0.0508 mm-0.0762 mm), and more preferably about 0.002 inch (0.0508 mm). Resin film layers 42 and 50 each preferably have a thickness about 0.002 inch-0.004 inch (0.0508 mm-0.1016 mm), which is just slightly greater than the inner resin film layers 38 and 46, and more preferably about 0.003 inch (0.0762 mm).

FIG. 6 illustrates the non-stretchable ply 34 in highly enlarged fashion before its assembly with plies 32 and 36. The non-stretchable ply 34 includes a resin film layer 54 on its inner surface 56 and a resin film layer 58 on its outer surface 60. Preferably, the thickness of resin film layer 54 is similar or identical to that of the resin film layers 38 and 46, and resin film layer 58 may be similar or identical to resin film layers 42 and 50. It will be appreciated that the precise thickness of all the resin film layers 38, 42, 46, 50, 54 and 58 may be varied from the precise dimensions given herein to meet the needs of a specific application. The resin film layers 38, 42, 46, 50, 54 and 58 ensure that sufficient resin is available during the manufacturing of the sleeve 12 to eliminate the possibility of any resin "starved" areas from being formed on the sleeve 12. In practice, the resin film layers 38, 42, 46, 50, 54 and 58 provide impregnation during pressure curing which ensures the presence of an adequate amount of binder for sealing, for forming a strong integrating layer matrix, for allowing stretch/elongation, and for further preventing washout or a dry uncoat condition from developing the cure process. The resin of the above-mentioned film layers acts as a binder to hold the plies together and to provide the required structural strength to contain a pressurized fluid without burst failing. The resin of the above-mentioned film layers also provides an anti-slip surface to further help to ensure against sliding, to enhance clamp-up and fill-in scratched/deformed areas, and to provide excellent sealing of the plys. The resin film layers 38, 42, 46, 50, 54 and 58 also serve to crosslink the adjacent plys 32, 34 and 36 to form a more durable interface between adjacent ones of the plys 32, 34 and 36. The resin film layers 38, 42, 46, 50, 54 and 58 also serve to enhance the bending characteristics of the sleeve 12, as well as to impart a higher use temperature and extended service life to the sleeve 12. Optionally, a fluoro-elastomer coating could be used in place of the resin film layers. This option would enable a mid-section of the sleeve 12, or even the outer end portions 12a and 12b, to gradually self-configure to, and retain, a desired shape on the opposing end portions 18 and 22 of the sleeve 12 after the sleeve 12 is secured to the ducts 20 and 24, and after long term heat exposure, without causing a preloaded condition.

With further reference to FIG. 3, the non-stretchable ply 34 has an axial length, represented by arrow 62, that is preferably about equal to the axial length of the gap denoted by arrow 26. Alternatively, the non-stretchable ply 34 may have an axial length that is just slightly longer than the axial gap so that it extends to the beads 28 and 30 disposed closest to the facing terminal ends of the ducts 18 and 20. The sleeve 12 is arranged during assembly on the free ends of the ducts 18 and 22 so that the non-stretchable layer 34 is positioned in the gap defined by arrow 26. The construction of the sleeve 12 is such that opposing end portions 12a and 12b, being flexible, enable the sleeve 12 to be easily installed over the free ends 18 and 22 of the ducts 20 and 24, even if some axial misalignment of the free ends 18 and 22 exists. The opposing end portions 12a and 12b of the sleeve 12 preferably overlap their respective duct free end 18 or 22 by about 1.0 inch-3.0 inch (25.4 mm-76.2 mm), and more preferably by about 1.5 inch (38.1 mm), as indicated by arrow 27 in FIG. 3. Keeping the axial length of the non-stretchable ply 34 just slightly shorter than the gap separating the ducts 20 and 24 eases manipulating the opposing ends portions 12a and 12b over the free ends 18 and 22. However, the axial length of the non-stretchable ply 34 could be made slightly longer than the gap (defined by arrow 26) if desired. The non-stretchable ply 34 of the sleeve 12 prevents ballooning and rupturing of the sleeve 12 in the gap area defined by arrow 26.

Referring to FIG. 7, the formation of the sleeve 12 will now be described. It will be appreciated that the sections of material that will be used for the plies 32, 34 and 36 are preferably cut to length away from the tool that will be used to form the sleeve 12. This ensures that cutting through one particular ply will not damage the ply underneath it, such as might occur if a utility knife was used to cut plys while they are positioned on the tool. The circumferential length of each ply 32, 34 and 36 is determined primarily by the diameter of ducts that the sleeve 12 will be used on, and the diameter of the tool 64 will be generally in accordance with the diameter of the ducts. The circumferential length of each ply 32, 34 and 36 is preferably that length which allows for a small degree of overlap at the seam that is formed at each ply 32, 34 and 36, as will be described more fully below.

The sleeve 12 is formed by first wrapping a length of the first stretchable ply 32 around a tubular hollow tool 64 or mandrel. The tool 64 need not be circular in shape, but instead could oval shaped, or it could take a shape in accordance with the cross-sectional shape of the ducts with which the sleeve 12 is intended to be used. The first stretchable ply 32 will typically have a layer of protective film (not shown) that needs to be removed before placing the first stretchable ply 32 on the tool 64. The first stretchable ply 32 is arranged such that a first seam 66 is formed by a small amount of overlap of the edges of the first stretchable ply 32. The overlap, designated by arrows 68, is preferably on the order of about 0.25 inch-1.5 inch (6.35 mm-38.1 mm), and more preferably about 0.75 inch (19.05 mm). The tool 64 preferably has a plurality of very small air holes 70 over its entire surface to ease removal of the sleeve 12 from the tool 64, as will be explained in the following paragraphs.

Referring further to FIG. 7, the protective film (not shown) covering the second (i.e., outer) surface 44 of the first stretchable ply 32 is removed, the protective film (not shown) covering the resin film layer 54 on the first (inner) surface 56 of the non-stretchable ply 34 is removed and the non-stretchable ply is layed up on the first stretchable ply 32. Care is taken to axially center the non-stretchable ply 34 over the first stretchable ply 32 so that an approximately equal amount of material of the first stretchable ply 32 extends past the opposite axial ends of the non-stretchable ply 34. The non-stretchable ply 34 is further positioned such that its edges form a second seam 72, in this example at the 9 o'clock position on the tool 64, which is 90 degrees circumferentially offset from the first seam 66.

Referring to FIG. 8, the protective film (not shown) covering the resin film layer 46 on the first (inner) surface 48 of the second stretchable ply 36 is then removed, the protective film (not shown) covering the resin film layer 58 of on the second (i.e., outer) surface 60 of the non-stretchable ply 34 is removed, and the second stretchable ply 36 is layed up over the non-stretchable ply 34. Care is taken to position the second stretchable ply 36 so that it is approximately centered over the non-stretchable ply 34. The opposing edges of the second stretchable ply 36 are overlapped to form a third seam 74. The third seam 74 is circumferentially offset from the second seam 72 by about 90 degrees. Thus, the seams 66, 72 and 74 are spaced around the tool 64 so that there is no excessive build up of material at one area of the sleeve 12.

FIG. 9 illustrates a different embodiment 12' of the sleeve that incorporates an additional stretchable ply 76, with its seam formed at the 6 o'clock position. Thus, four seams are present at 90 degree intervals around the tool 64. If more than four plys of material are used to form the tool, the seams could be arranged so that they are evenly spaced. For example, if six plys of material are used to form the sleeve 12, then the seams could be arranged every 60 degrees around the tool 64.

When the plys 32, 34 and 36 have been layed up on the tool 64 the tool may be placed in an oven or autoclave for a suitable time to cure, which will typically be about 1.5 hours to about 1.75 hours. During this time the resin film layers 38, 42, 46, 50, 54 and 58, plus the resin in the plies 32, 34 and 36, will melt and flow evenly throughout the plies 32, 34 and 36 to form a unitary, laminated assembly. After the above-mentioned time period is complete, the tool 64 is removed from the oven or autoclave and allowed to cool for a suitable time, typically between 20 minutes to about 1 hour. Referring to FIG. 7, the ends of the tool 64 may be capped (not shown) and a pressurized air source 78 with conduit 80 directed through one of the end caps used to help release the sleeve 12 from the outer surface of the tool 64.

Figure 10:
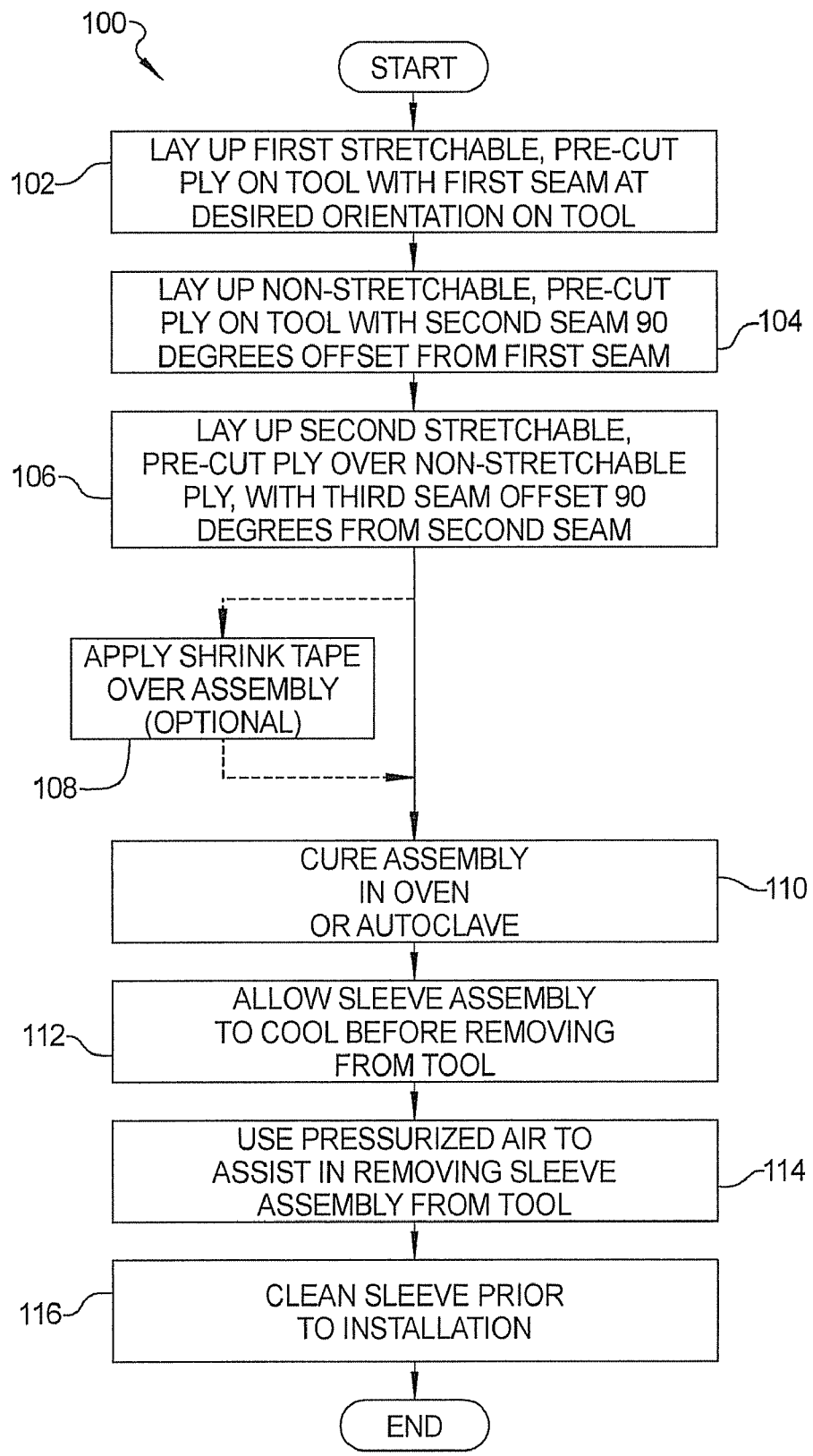
FIG. 10 is a flowchart summarizing the operations of an exemplary molding operation used to form the sleeve of the coupling apparatus.

Referring to FIG. 10, a flowchart 100 is illustrated that summarizes major operations of the process of forming the sleeve 12. At operation 102 the first stretchable ply 32 is positioned on the tool 64 with its seam 66 at a desired location on the tool 64. At operation 104 the non-stretchable ply 34 is layed up over the first stretchable ply 32, and such that its seam 72 is offset by about 90 degrees from the first seam 66. At operation 106 the second stretchable ply 36 is positioned over the non-stretchable ply 34 and the third seam 74 is offset about 90 degrees from the second seam 72. Operation 108 is optional, and involves placing a shrink wrap tape over the sleeve 12 before the cure process. At operation 110 the sleeve 12 is cured in an oven or autoclave for a desired time. At operation 112 the tool 64 is removed from the oven or autoclave and allowed to cool for a predetermined period of time. At operation 114 pressurized air may be used to assist in removing the sleeve 12 from the tool 64. At operation 116 the sleeve is cleaned prior to installation.

Referring to FIG. 11, another sleeve 200 is presented in accordance with the present disclosure. The sleeve 200 is similar to the sleeve 12 but with the exception that it includes a helical coil 202 that is sandwiched between material plies 204 and 206 during construction thereof. The helical coil in this example is triangular shaped and has a length that is about equal to the length of the gap 26 (FIG. 3). The triangular shape provides a surface 202a that is planar, and thus provides a much greater contact surface area for securing to one or both of the plies 204 and 206. The helical coil 202 also eliminates the possibility of air pockets being formed at the edges 202b, during manufacture, which over time can raise the possibility of delamination of the plys 204 and 206 from the helical coil 202. Stitching 208 on both sides of the helical coil 202 could also be used to provide even further structural strength to the sleeve 200. It will be appreciated that the non-stretchable ply 34 may not be required in this embodiment of the sleeve.

Referring to FIG. 12, another sleeve 300 embodiment is shown. This embodiment is otherwise identical to the sleeve 200 but uses a D-shaped helical coil 302 sandwiched between material plys 304 and 306. Flat surface 302a similarly provides an increased contact area to enhance durability and longevity of the sleeve 300. Stitching 308 can optionally be employed to further enhance the strength of the sleeve 300.

Referring to FIG. 13, With either of the sleeves 200 and 300, reinforcement tape/strips 310 could be placed over the sleeves 200 or 300 at spaced apart locations on the helical coil (200 or 300) prior to laminating the sleeve 200 or 300. This would further assist in maintaining the helical coils 202 or 302 stationary during the laminating process described above, and further provide additional strength to the sleeve 200 or 300, and further ensure against delamination of the helical coil 200 or 300 from the material plies to which it is laminated.

Referring to FIG. 14, a sleeve 400 that has a construction that is different from sleeve 12 is shown. With the sleeve 400, a continuous length of stretchable ply material, having an overall length needed to form the desired number of stretchable plys is used, rather than a plurality of independent stretchable plys. The stretchable ply is denoted by reference number 402. The non-stretchable ply is denoted by reference number 404. The stretchable ply 402 in this example has a length sufficient to wrap around the circumference of the tool 64 three complete times, to thus form essentially three stretchable plies. The non-stretchable ply 404 is orientated on the circumference of the tool 64 so that its seam 404a is offset by 90 degrees from the seam 402a formed by the stretchable layer 402 (which is at the 12 o'clock position). Preferably, about 0.75 inch of overlap (19.05 mm) is allowed when forming the seam 404a. The axial length of the non-stretchable ply 404 is also about the same as the gap 26, as explained hereinbefore.

FIG. 15 shows another sleeve 500 which is a variation of the sleeve 400. The difference with sleeve 500 is that one complete wrap (i.e., 360 degree revolution) of a stretchable ply 502 is formed on the tool 64 before a non-stretchable ply 504 is layed up on the stretchable ply 502. The non-stretchable ply is further orientated so that its seam 504a is offset by about 90 degrees from the seam 502a of the stretchable ply. Otherwise, stretchable ply 502 forms essentially three plys, as its length is sufficient to wrap around the tool 64 three complete revolutions. Preferably, about 0.75 inch of overlap is present at the seam 504a. The axial length of the non-stretchable layer 504 is preferably about equal to the axial gap 26.

Figure 16:
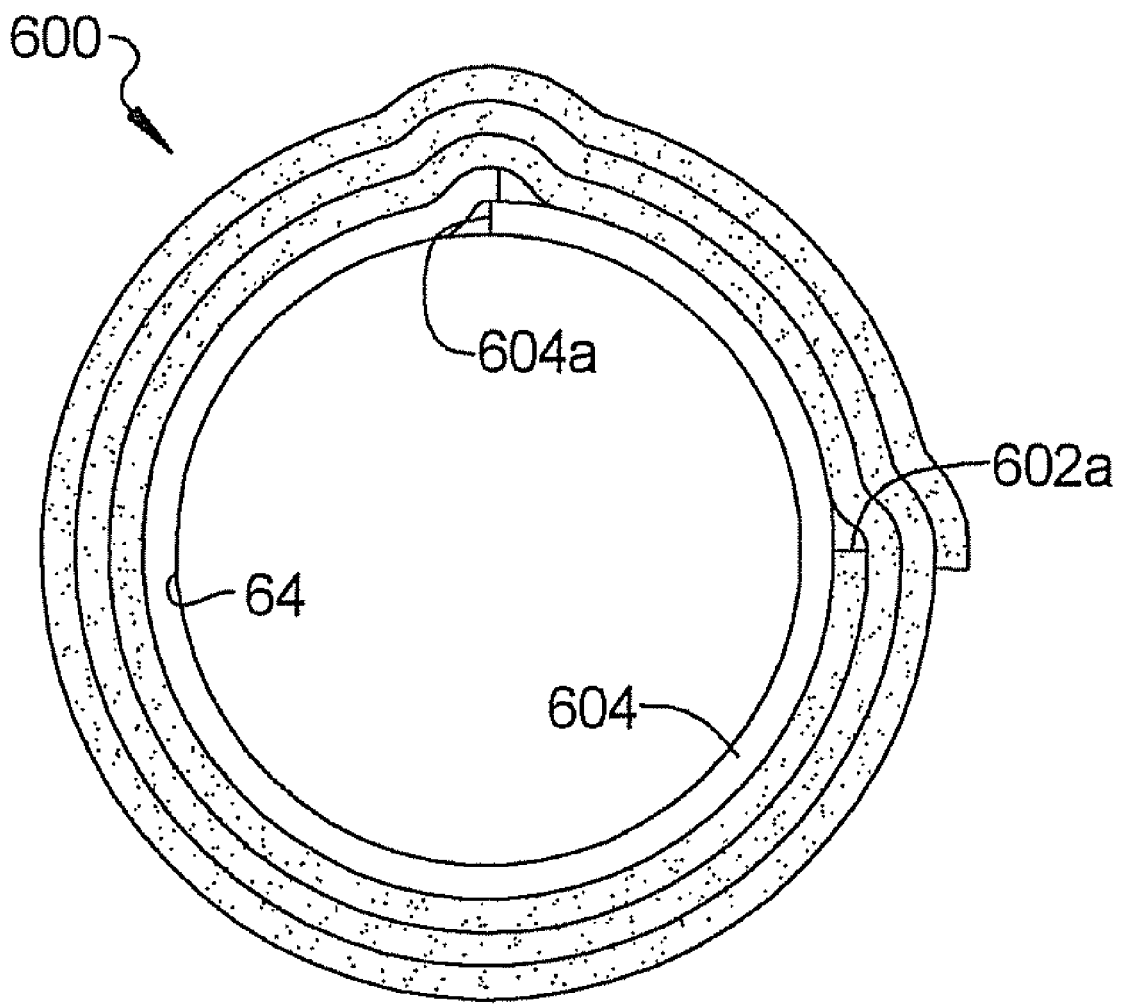
FIG. 16, a view of another embodiment of the sleeve in which the non-stretchable layer is wrapped directly on the outer surface of the tool.

FIG. 16 shows another sleeve 600 of the present disclosure. Sleeve 600 is similar to sleeves 400 and 500 with the exception that a non-stretchable layer 604 is layed up first on the tool 64. A stretchable ply 602 having a length sufficient to wrap around the tool 64 three complete revolutions is then wrapped over the non-stretchable ply, with the seam 602a of the stretchable ply arranged so that it is about 90 degree offset from the seam 604a of the non-stretchable ply. Preferably about 0.75 inch of overlap is present at the seam 604a. The axial length of the non-stretchable ply 604 is preferably about equal to the axial gap 26.

The apparatus 10 of the present disclosure thus provides a means for coupling the free ends of a pair of ducts, without the drawbacks and disadvantages associated with previously developed coupling devices. The apparatus 10, and particularly the sleeve 12, is highly resistant to ballooning, slippage and rupture, and yet forms a lightweight assembly that is cost effective and easy to manufacture. Advantageously, the opposing end portions 12a and 12b of the sleeve 12 are flexible to allow the sleeve to be easily coupled to even slightly misaligned ducts. The non-stretchable ply 34 that is formed within the sleeve 12 significantly resists ballooning and rupture.

In another embodiment, the sleeve 12 could be formed with loops that the band of a clamp, for example hose clamp 14 or 16, may extend through. The use of loops may also help to further ensure against slippage of the sleeve on the ducts to which it is secured.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A coupling apparatus for coupling free ends of a pair of tubular ducts in flow communication with one another, the free ends of the ducts being separated by an axial gap having a known, approximate axial length, and the ducts adapted to flow a fluid therethrough, the apparatus comprising:

a sleeve having a length sufficient to span said axial gap and to overlap portions of said free ends of said ducts when said sleeve is secured to said free ends of said ducts, said sleeve including:

a first stretchable ply of material, a non-stretchable ply of material, and a second stretchable ply of material sandwiched together, with the non-stretchable ply of material disposed between the first and second stretchable plies of material, to form a unitary assembly, said non-stretchable ply of material having an axial length approximately equal to the known, approximate axial length of said axial gap to overlay said axial gap, and to overlay substantially a full length of said axial gap, while said sleeve has an inner diameter approximately the same as an outer diameter of said free ends of said ducts so as not to impede flow of said fluid between said free ends of said pair of tubular ducts;

said first stretchable ply of material has a first seam, said non-stretchable ply of material has a second seam, and said second stretchable ply of material has a third seam; and wherein said second seam is circumferentially offset from said first seam by about 90 degrees, and said third seam is circumferentially offset from said second seam by about 90 degrees.

2. The apparatus of claim 1, wherein at least one of said first and second stretchable plys of material comprises a resin-impregnated material.

3. The apparatus of claim 1, wherein at least one of said first and second stretchable plys of material comprises a resin film layer on both surfaces thereof.

4. The apparatus of claim 1, further comprising a pair of clamps for securing portions of said sleeve to said free ends of said ducts.

5. A coupling apparatus for coupling a free end of each one of a pair of tubular ducts in flow communication with one another, the apparatus comprising:

a tubular sleeve including:

a first stretchable ply of material having a first surface and a second surface, said first surface being adapted to be placed against an exterior surface of each said free end of said pair of ducts, and said first stretchable ply including a first seam disposed at a first peripheral location;

a non-stretchable ply having first and second surfaces, and having said first surface disposed against said second surface of said first stretchable ply, and said non-stretchable ply further having a second seam arranged such that it is circumferentially offset from said first seam;

said non-stretchable ply further having an axial length less than that of said first stretchable ply and being positioned such that opposite ends of said first stretchable ply extend past said opposing edges of said non-stretchable ply; and a second stretchable ply having a first surface, a second surface and a third seam, said first surface being positioned against said second surface of said non-stretchable ply, and said third seam being circumferentially offset from said second seam.

6. The apparatus of claim 5, wherein terminal edges of said first stretchable ply overlap by about 0.25 inch-1.5 inches to form said first seam.

7. The apparatus of claim 5, wherein said first, second and third seams are uniformly spaced apart from one another circumferentially around said sleeve.

8. The apparatus of claim 7, wherein said second seam is circumferentially offset from said first seam by about 90 degrees, and said third seam is circumferentially offset from said second seam by about 90 degrees.

9. The apparatus of claim 5, wherein at least one of said first and second stretchable plys comprises a fabric ply.

10. The apparatus of claim 5, wherein at least one of said first and second stretchable plys comprises a resin film layer on each surface thereof.

11. The apparatus of claim 10, wherein said at least one of said first and second stretchable plys includes a resin film layer having a thickness of about 0.001 inch-0.003 inch on one of its first and second surfaces.

12. The apparatus of claim 10, wherein said at least one of said first and second stretchable plys includes a first resin film layer having a thickness of about 0.001 inch-0.003 inch on one of its first and second surfaces, and a second resin film layer having a thickness of about 0.002 in-0.004 inch on the other of its first and second surfaces.

13. The apparatus of claim 10, wherein both of said stretchable plys include resin film layers on both surfaces thereof.

14. The apparatus of claim 10, wherein said non-stretchable ply comprises a fibrous ply of material.

15. The apparatus of claim 10, wherein said non-stretchable ply comprises a braided ply of material.

16. The apparatus of claim 10, further comprising a plurality of clamps adapted to circumscribe portions of said first and second stretchable plys to clamp said first and second stretchable plys to said ducts.

17. A coupling apparatus for coupling over free ends of a pair of tubular ducts in flow communication with one another, the free ends of the ducts being separated by an axial gap and the ducts being operable to pass a fluid therethrough, the apparatus comprising:

a sleeve having an axial length sufficient to span said gap and to overlap portions of said free ends of said ducts when said sleeve is secured to said free ends of said ducts, said sleeve including:

a first stretchable ply of material, a generally non-expandable helical coil, and a second stretchable ply of material sandwiched together, with the helical coil disposed between the first and second stretchable plies of material, to form a unitary assembly, said helical coil having an axial length limited to a length that is approximately equal to a length of said axial gap to overlay said axial gap;

said helical coil having a cross-sectional shape providing at least one flat surface, with said flat surface being positioned against one of said first and second stretchable plies of material to enhance a bond between said helical coil and said one stretchable ply; and said first and second stretchable plies of said sleeve each having a length longer than the generally non-expandable helical coil, with one of the first and second stretchable plies having an inner diameter that is approximately equal to an outer diameter of the free ends of the pair of ducts generally constant outer diameter over the axial length thereof.

* * * * *